United States Patent [19]

Taylor

[11] Patent Number: 4,582,303

[45] Date of Patent: Apr. 15, 1986

[54] SEAL PROTECTING CONSTRUCTION FOR LIQUID SPRING

[75] Inventor: Douglas P. Taylor, North Tonawanda, N.Y.

[73] Assignee: Tayco Developments, Inc., North Tonawanda, N.Y.

[21] Appl. No.: 229,680

[22] Filed: Jan. 29, 1981

[51] Int. Cl.$^4$ .............................................. F16F 9/36
[52] U.S. Cl. .......................... 267/64.13; 188/322.17; 277/11
[58] Field of Search ................ 277/11; 92/143; 267/64.11, 64.13, 118, 129; 188/322.17, 268

[56] References Cited

U.S. PATENT DOCUMENTS

| | | | |
|---|---|---|---|
| 2,643,112 | 6/1953 | Smith | 267/64.13 |
| 3,256,005 | 6/1966 | Taylor | 267/64.13 |
| 3,722,640 | 3/1973 | Taylor | 188/322.22 |
| 3,726,368 | 4/1973 | Taylor | 188/316 |
| 3,771,629 | 11/1973 | Fader et al. | 188/322.17 |
| 3,876,044 | 4/1975 | Kendell et al. | 188/268 X |
| 4,064,977 | 12/1977 | Taylor | 188/268 X |
| 4,079,925 | 3/1978 | Salin | 267/129 |
| 4,166,523 | 9/1979 | Fujii et al. | 188/322.17 |
| 4,298,194 | 11/1981 | Marx | 267/64.11 |

FOREIGN PATENT DOCUMENTS 2122966  11/1972  Fed. Rep. of Germany ................ 188/322.17

Primary Examiner—George E. A. Halvosa
Attorney, Agent, or Firm—Joseph P. Gastel

[57] ABSTRACT

A damped liquid spring construction in which high instantaneous pressure rises are damped so as not to be experienced at the seal including a cylinder containing compressible liquid with a piston in the cylinder and a seal located in sealing engagement with the piston, and an annular pressure damping ring mounted in contiguous relationship to the seal, the pressure damping ring including an annular surface spaced from the outside surface of the piston for providing an annular space around the piston for restricting transmission of pressure and shock pulses from the main portion of the cylinder to the portion at which the seal is located, to thereby damp high substantially instantaneous pressure rises before the high pressure can affect the seal.

14 Claims, 9 Drawing Figures

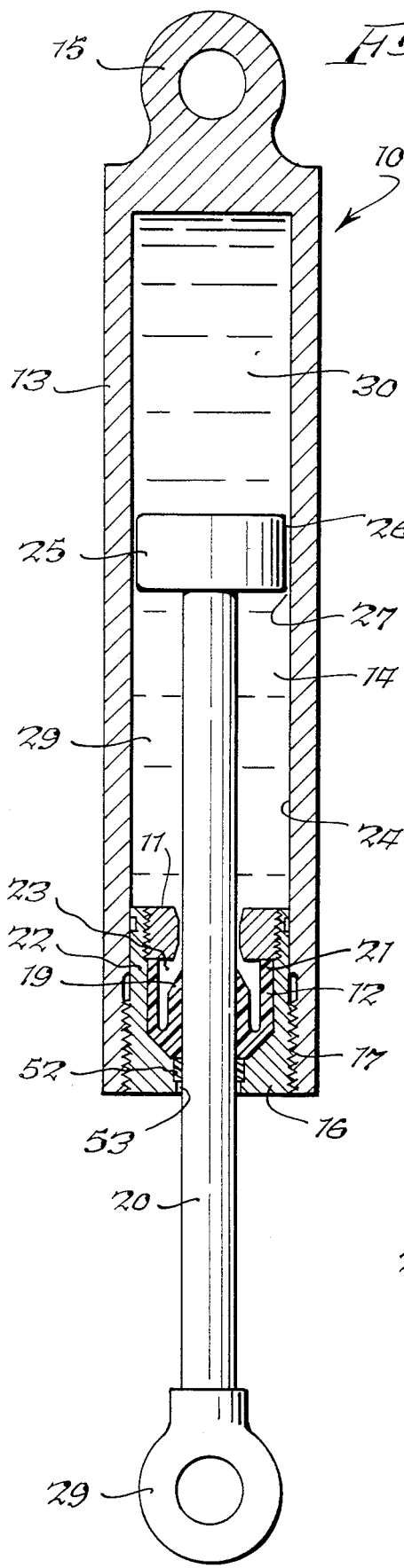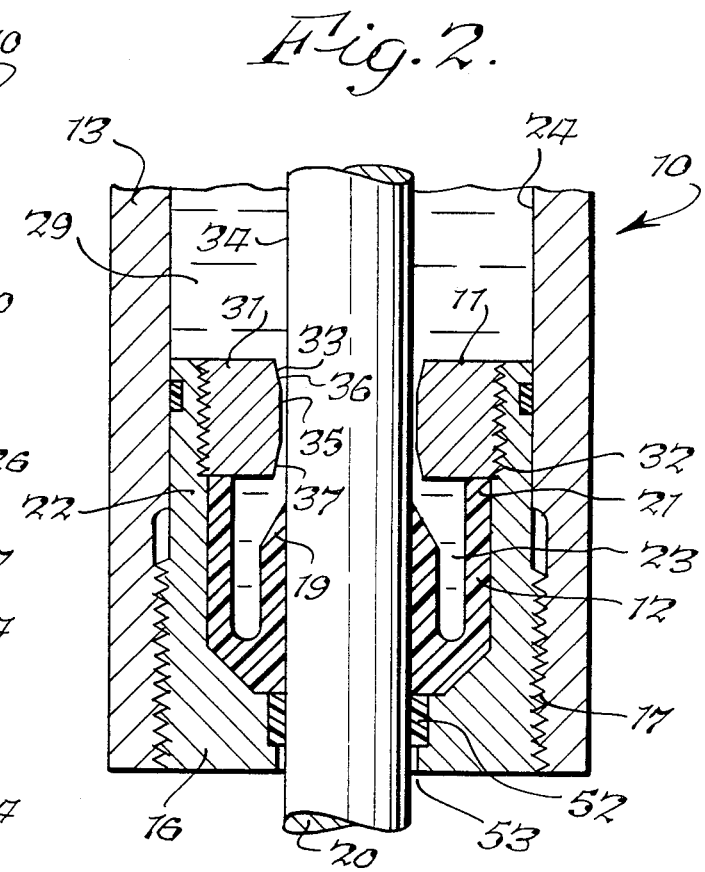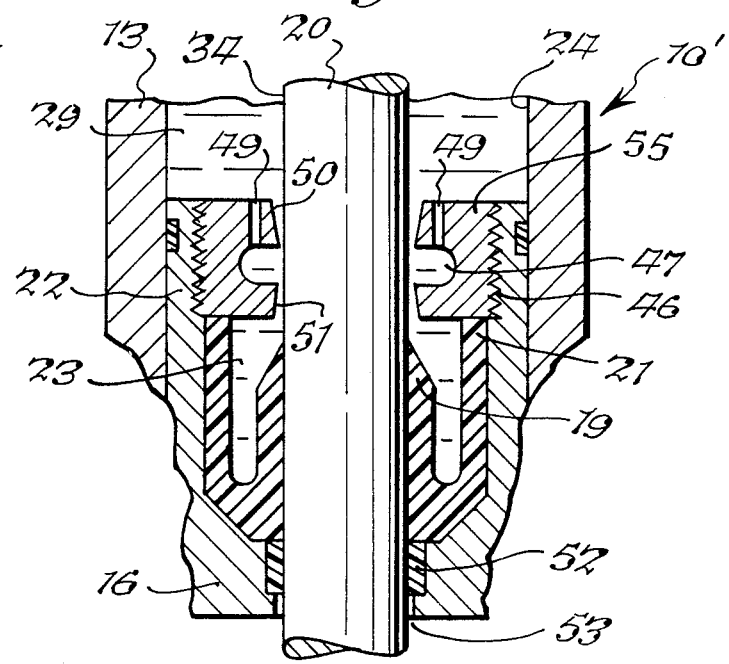

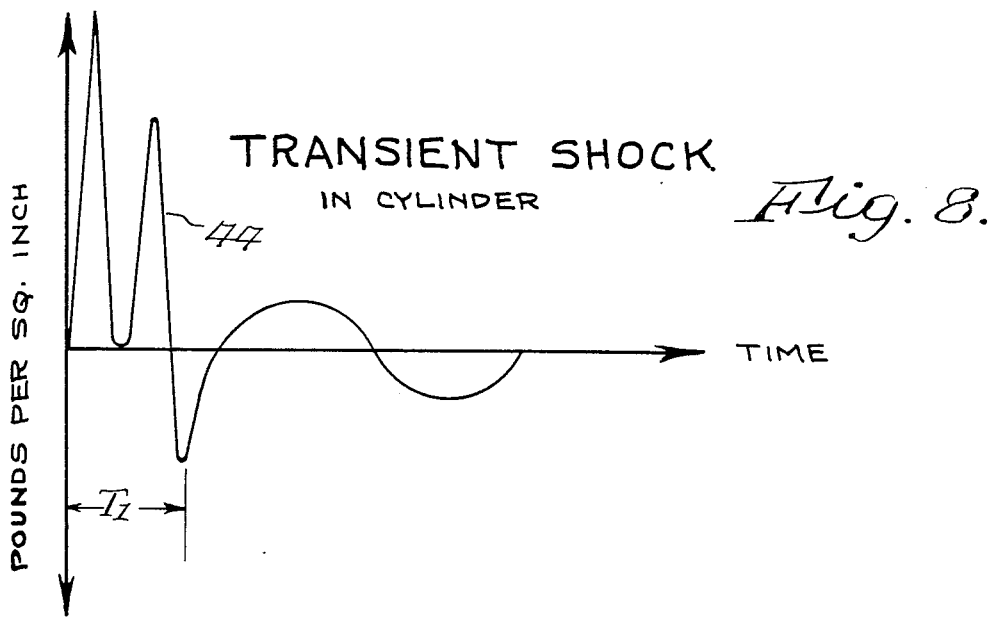
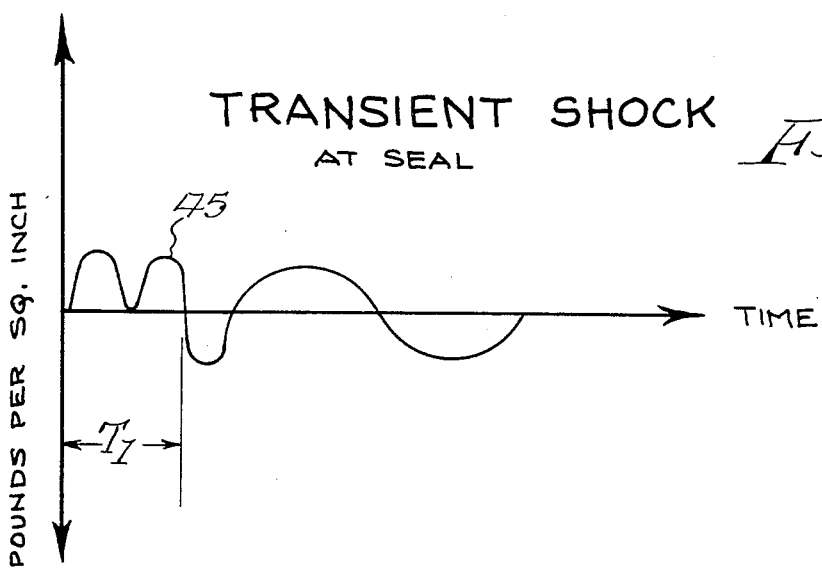

SEAL PROTECTING CONSTRUCTION FOR LIQUID SPRING

BACKGROUND OF THE INVENTION

The present invention relates to a damped liquid spring possessing a construction for protecting the seal against injury when the liquid spring is subjected to substantially instantaneous high forces.

By way of background, liquid springs are utilized in conjunction with weapon systems or earthquake restraints to protect objects against injury resulting from substantially instantaneous shocks of high magnitude, as might be experienced from an explosive blast or earthquake. Under these circumstances the liquid within the liquid spring rises in pressure instantaneously to an extremely high value, which may be sufficient to damage the liquid spring seal and possibly even overstress the seal to the point of failure. It is with protecting the seal under the foregoing circumstances that the present invention is concerned.

SUMMARY OF THE INVENTION

It is accordingly the object of the present invention to provide a pressure damping construction for a liquid spring which protects the seal against damage from substantially instantaneous pressure increases of high magnitude. Other objects and attendant advantages of the present invention will readily be perceived hereafter.

The present invention relates to a liquid spring construction in which high instantaneous pressure rises are damped so as not to be experienced at the seal comprising a cylinder, a piston in said cylinder, a seal mounted on said cylinder and located in sealing engagement with said piston, a first chamber in said cylinder remote from said seal, a second chamber in said cylinder proximate said seal, a body of compressible liquid in said first and second chambers, and pressure damping means fixedly mounted within said cylinder in contiguous relationship to said seal and between said first and second chambers for damping high substantiallly instantaneous rises in pressure of said compressible liquid experienced in said first chamber before they are transmitted to said second chamber where they can affect said seal. The various aspects of the present invention will be more fully understood when the following portions of the specification are read in conjunction with the accompanying drawings wherein:

BRIEF DESCRIPTION OF THE DRAWINGS

FIG. 1 is a cross sectional view of a liquid spring of the present invention which includes the seal protecting construction of the present invention;

FIG. 2 is an enlarged fragmentary view of the seal protecting construction of the present invention;

FIG. 3 is a fragmentary cross sectional view similar to FIG. 2 but showing an alternate form of seal protecting constuction;

FIG. 8 is a graph depicting the transient shock experienced by the liquid in the cylinder as a function of time; and FIG. 9 is a graph depicting the transient shock experienced at the seal as a function of time.

DESCRIPTION OF THE PREFERRED EMBODIMENTS

Figure 4:
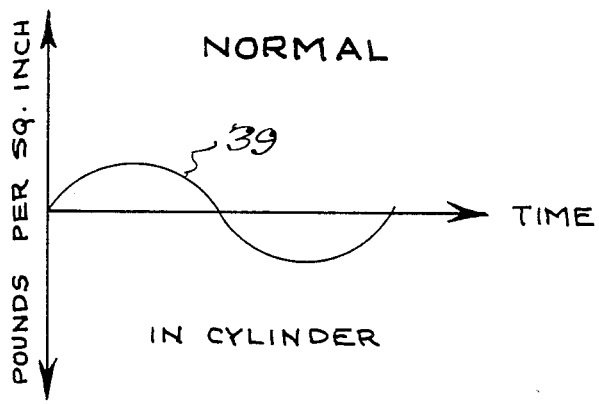
FIG. 4 is a graph depicting the normal changes in pressure experienced by the liquid in the cylinder as a function of time.

The liquid spring 10 of the present invention includes a seal protecting construction 11 fixedly mounted adjacent seal 12 to protect it against rupture when the liquid spring 10 is subjected to extremely high instantaneous shocks, as might be experienced during an earthquake or explosion. The liquid spring 10 includes a cylinder 13 which contains a compressible liquid 14, such as silicone liquid. One end of cylinder 13 includes an eye 15 for attaching the cylinder to an external body. Seal 12 is mounted within cap 16 which is threaded into cylinder 13 at 17. Seal 12 includes an annular lip portion 19 which is in engagement with piston 20 to thereby seal piston 20 against leakage. An annular portion 21 of seal 12 fits within the annular side wall 22 of cap 16. Seal 12 is fully disclosed in Taylor U.S. Pat. No. 3,256,005, and the teaching of this patent is incorporated herein by reference. Seal anti-extrusion ring 52 is installed in cap 16 and provides a clearance between cap 16 and piston 20. A chamber 23 is defined in the annular space between annular lip 19 and annular seal portion 21, and compressible liquid is contained in chamber 23. The inside surface of cylinder 13 defines a chamber 24 in which the remainder of the hydraulic liquid 14 is located. Chamber 24 is divided into chambers 29 and 30 by cylindrical damping head 25 mounted on piston 20. The outer surface 26 of damping head 25 is of slightly less diameter than the internal diameter of cylinder 13, to thereby provide a clearance 27 therebetween. An eye 29 is mounted on the end of piston 20 for attachment to an external member.

During operation, piston 20 will move in and out of cylinder 13. When the speed of piston movement is below a predetermined value, the changes in pressure of liquid 14 will be gradual, and, in addition, the liquid to either side of shock damping head 25 can pass to the other side through the clearance space 27, without being substantially impeded by shock damping head 25. However, under certain circumstances where the liquid spring 10 is subjected to extremely high instantaneous forces when the piston is pulled out of the cylinder, the clearance space 27 is not sufficiently large to permit flow from chamber 29 on one side of shock damping head 25 to chamber 30 on the other side thereof. When this occurs, in the absence of pressure damping construction 11, extremely high instantaneous pressures will be applied to seal 12, and sometimes these pressures will be sufficiently high to explode the seal 12 and anti-extrusion ring out of cap 16 at clearance 53, or at the very least injure seal 12 so that it will fail after being subjected to a plurality of high magnitude instantaneous shocks. Reducing clearance 53 will minimize the chance of seal and anti-extrusion ring explosion, but will greatly increase the risk of damaging or scoring piston rod 20 and cap 16 due to a more intimate contact thereof.

In accordance with the present invention, a pressure damping construction 11 is fixedly mounted in contiguous relationship to seal 12 to protect it against injury. The pressure damping construction 11 comprises an annular ring 31 which is threaded into cap 16 at 32. A space is provided between annular inner surface 33 of member 31 and the outside surface 34 of piston 20 to provide a pressure damping effect. In this respect, the contour of surface 33 may be identical to that shown and described in U.S. Pat. No. 3,722,640 wherein the surface is located on a piston head and the clearance is between the piston head and the internal surface of the cylinder. The teaching of U.S. Pat. No. 3,722,640 is incorporated herein by reference. However, the difference between the present shock damping structure 11 and that shown in U.S. Pat. No. 3,722,640 is that the present construction 11 is fixedly mounted in contiguous relationship to seal 12 whereas in U.S. Pat. No. 3,722,640 the shock damping structure is mounted on the piston head which is movable within the cylinder and does not in any way contribute toward protecting the seal.

Briefly, pressure damping member 11 includes a central flat surface 35 which is substantially parallel to piston 20 and a sloping entrance surface 36 which slopes away from piston 34 toward chamber 29. The pressure damping member 11 also includes a surface 37 which slopes away from the piston surface in a direction toward chamber 23. The various dimensions and preferred angles are all clearly described in the above-mentioned U.S. Pat. No. 3,722,640 which has been incorporated herein by reference and it is deemed that a further description is not necessary, as it will be appreciated that those skilled in the art can design pressure damping constructions for specific applications by following the teachings of the present disclosure and the aforementioned U.S. Pat. No. 3,722,640.

Figure 5:
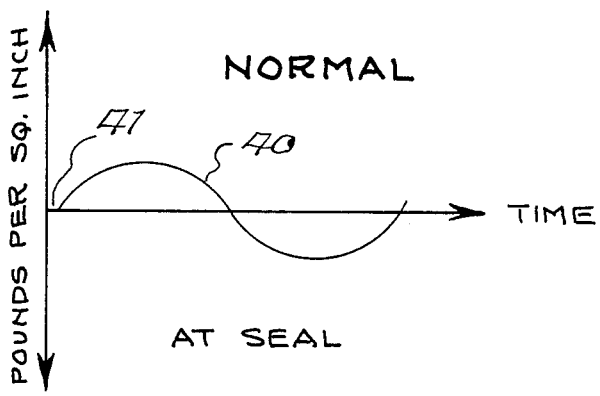
FIG. 5 is a graph depicting the normal changes in pressure experienced at the seal as a function of time.

The operation of the shock damping construction 11 can be better appreciated by reference to the graphs of FIGS. 4–9. In FIG. 4 a graph is shown plotting the pressure within the cylinder as a function of time. When a relatively low force is applied to the piston producing a pressure waveform 39 in the cylinder, the pressure curve at the seal 12 will be as shown in FIG. 5 at 40. The only difference between the curves of FIG. 4 and FIG. 5 is that there is a phase angle lag at 41 at the seal. Otherwise, both the seal and the inside of cylinder 13 experience the same pressures. The phase angle lag 41 is due to the relative restriction provided by the space between annular surface 33 and the outside surface 34 of piston 20.

Figure 6:
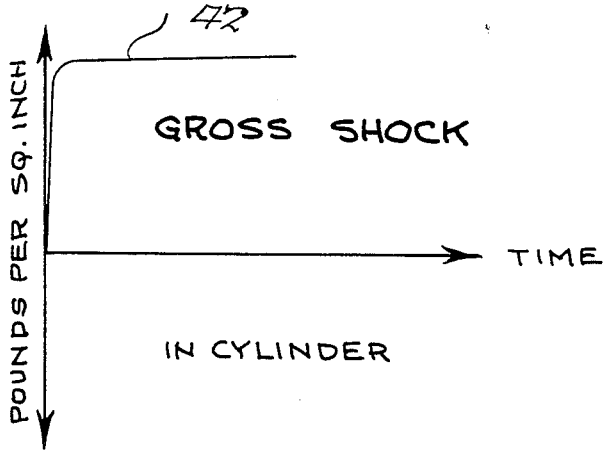
FIG. 6 is a graph depicting the gross shock experienced by the liquid in the cylinder as a function of time.
Figure 7:
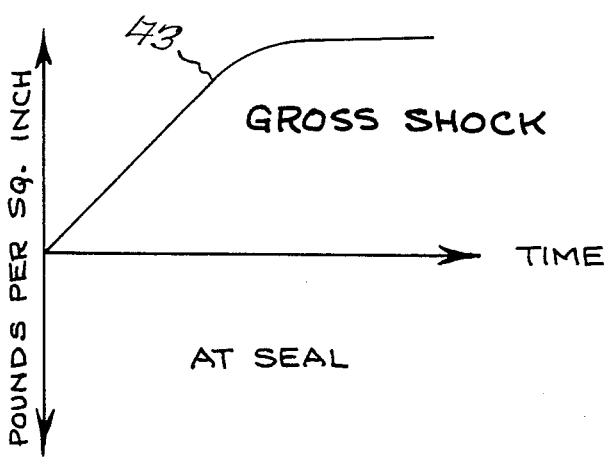
FIG. 7 is a graph depicting the gross shock experienced at the seal as a function of time.

When the liquid spring 10 experiences a gross shock, namely, a force of extremely high magnitude and substantially instantaneous acceleration, so that piston 20 tends to be driven out of cylinder 13 at a high rate of velocity, the pressure rise on the liquid in chamber 29 is depicted by graph 42 in FIG. 6, which is a plot of pressure as a function of time. However, during this same time period, the gross shock or pressure in chamber 23 is depicted by graph 43 in FIG. 7. In other words, while the pressure in chamber 23 at the seal will rise to the same magnitude as the pressure in chamber 29, FIG. 7 shows that the pressure rise is much more gradual, thereby obviating the instantaneous shock which could be applied to seal 12 to tend to rupture it.

FIGS. 8 and 9 show the relationship between the transient shock in chamber 29 of the cylinder as compared to the transient shock in chamber 23 adjacent seal 12. Graph 44 shows the manner in which the pressure fluctuates immediately after the liquid spring 10 is subjected to a high magnitude instantaneous shock and shows how the pressure thereafter levels off. Graph 45 in FIG. 9 shows the pressure relationship in chamber 23 adjacent seal 12 at times corresponding to the transient shock experienced by the cylinder, as shown in FIG. 8. A comparison of graphs 8 and 9 indicates that the initial high fluctuations in pressure are never experienced at seal 12. This can be seen by a comparison of the portion of curve 44 with the portion of curve 55 during time $T_1$. Thereafter, the pressures in chambers 29–30, on one hand, and chamber 23, on the other hand, will equalize.

In FIG. 3 a modified form of shock damping construction is shown. In this embodiment the shock damping structure 45 differs from the shock damping structure 11 of FIG. 2. However, except for this difference, all other parts of the liquid spring 10' are identical to the parts of liquid spring 10 and consequently will not be discussed. The shock damping structure 55 may be identical in all respects to the shock damping structure disclosed in Taylor U.S. Pat. No. 3,726,368, which is incorporated herein by reference. The only difference is that in the patent the shock damping structure is mounted on the piston head for movement with the piston whereas the shock damping structure of FIG. 3 is a fixedly mounted annular ring 55 located immediately adjacent to the seal to protect it against extremely high pressure increases resulting from extremely high magnitude instantaneous shocks, such as those experienced during an earthquake or explosion. Shock damping ring 55, which is threaded into wall 22 of cap 16 at 46 includes an annular collector ring 47 having a plurality of annularly spaced drilled passages 49 in communication therewith, with the other end of passages 49 being in communication with chamber 29. A slightly tapered or curved annular surface 50, which is venturi-like, is located as shown between chamber 29 and annular collector ring 47. A similar annular tapered surface 51 is located between annular collector ring 47 and chamber 23. Surfaces 50 and 51 provide the desired clearance between the annular damping structure 55 and the outside surface 34 of piston 20. This structure, as noted above, is completely described in the above-mentioned U.S. Pat. No. 3,726,368. The specific dimensions are within the scope of one skilled in the art, and can be designed for different structures.

While preferred embodiments of the present invention have been disclosed, it will be appreciated that the present invention is not limited thereto but may be otherwise embodied within the scope of the following claims.

What is claimed is:

1. A liquid spring construction in which high instantaneous pressure rises are damped so as not to be experienced at the seal comprising a cylinder, a piston in said cylinder, a seal mounted on said cylinder and located in sealing engagement with said piston, a first chamber in said cylinder remote from said seal, a second chamber in said cylinder proximate said seal, a body of compressible liquid in said first and second chambers, and pressure damping means fixedly mounted within said cylinder in contiguous relationship to said seal and between said first and second chambers for damping high substantially instantaneous rises in pressure of said compressible liquid experienced in said first chamber before they are transmitted to said second chamber where they can affect said seal.

2. A liquid spring construction as set forth in claim 1 wherein said seal is mounted in a cap, and wherein said pressure damping means is also mounted on said cap.

3. A liquid spring construction as set forth in claim 1 wherein said pressure damping means comprises an annular member having an inner surface for providing a liquid flow path between it and said piston for compressible liquid in said first chamber which tends to move into said second chamber and toward said seal.

4. A liquid spring construction as set forth in claim 3 wherein said liquid flow path comprises a first volume and wherein said second chamber comprises a second volume which is substantially greater than said first volume.

5. A liquid spring construction as set forth in claim 3 wherein said seal includes an annular lip in sealing engagement with said piston and an annular seal portion surrounding said lip and spaced therefrom to define said second chamber therebetween.

6. A liquid spring construction as set forth in claim 5 wherein said annular member includes a portion which bears against said annular seal portion.

7. A liquid construction as set forth in claim 3 wherein said seal is mounted in a cap, and wherein said pressure damping means is also mounted on said cap.

8. A liquid spring construction as set forth in claim 7 wherein said cap includes an internally threaded portion, and wherein said annular member includes an externally threaded portion in threaded engagement with said internally threaded portion.

9. A liquid spring construction as set forth in claim 7 wherein said cap includes an internal surface, and wherein said annular member includes an external surface, and mechanical connection means between said internal and external surfaces.

10. A liquid spring construction as set forth in claim 1 wherein said seal includes an annular lip portion in engagement with said piston, and wherein said second chamber includes an annular chamber portion located in surrounding relationship to said annular lip portion.

11. A liquid spring construction as set forth in claim 10 wherein said seal includes an annular seal portion surrounding said lip and in engagement with said cylinder, and wherein said annular chamber portion is located between said lip and said annular seal portion.

12. A liquid spring construction as set forth in claim 11 wherein said liquid flow path comprises a first volume and wherein said second chamber comprises a second volume which is substantially greater than said first volume.

13. A liquid spring construction as set forth in claim 10 wherein said liquid flow path comprises a first volume and wherein said second chamber comprises a second volume which is substantially greater than said first volume.

14. A liquid spring construction as set forth in claim 13 wherein said pressure damping means comprises an annular member having an inner surface for providing a liquid flow path between it and said piston for compressible liquid in said first chamber which tends to move into said second chamber and toward said seal, wherein said seal is mounted in a cap, and wherein said pressure damping means is also mounted on said cap, and wherein said cap includes an internally threaded portion, and wherein said annular member includes an externally threaded portion in threaded engagement with said internally threaded portion.

* * * * *

UNITED STATES PATENT AND TRADEMARK OFFICE
CERTIFICATE OF CORRECTION

PATENT NO. : 4,582,303

DATED : April 15, 1986

INVENTOR(S) : Douglas P. Taylor

It is certified that error appears in the above-identified patent and that said Letters Patent are hereby corrected as shown below:

Column 5, line 20 (claim 7), after "liquid" insert --spring--.

Signed and Sealed this

Eighth Day of July 1986

[SEAL]

Attest:

DONALD J. QUIGG

Attesting Officer

Commissioner of Patents and Trademarks